Feb. 10, 1959 K. L. HALVERSON 2,873,050
MEASURING AND DISPENSING DEVICE
Filed Sept. 23, 1957

INVENTOR.
KENNETH L. HALVERSON
Kenneth L Halverson

United States Patent Office 2,873,050
Patented Feb. 10, 1959

2,873,050

MEASURING AND DISPENSING DEVICE

Kenneth L. Halverson, Onalaska, Wis.

Application September 23, 1957, Serial No. 685,471

1 Claim. (Cl. 222—158)

This invention relates to dispensing apparatus and more particularly to a combination measuring and dispensing closure member for jars.

It is an object of the present invention to provide a measuring and dispensing device that may be readily secured to the threaded discharge opening of various types of containers, such as cans and jars to facilitate the dispensing of predetermined quantities of fluent material therefrom.

It is another obpect of the present invention to provide a measuring and dispensing device of the above type which may be readily operated by one hand, is maintained in constant engagement with the container so as to reduce the loss of flavor and aroma of the contents, and which effectively reduces loss of the product through evaporation and the like.

Other objects of the invention are to provide a measuring and dispensing device bearing the above objects in mind which is of simple construction, has a minimum number of parts, is inexpensive to manufacture and efficient in operation.

Figure 1:
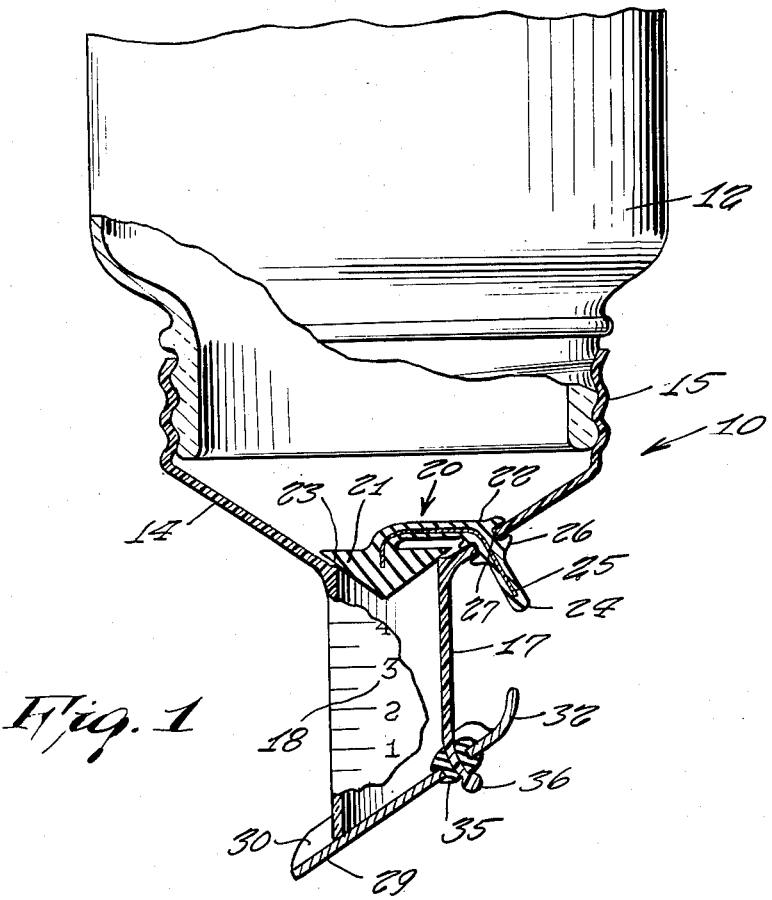
Figure 2:
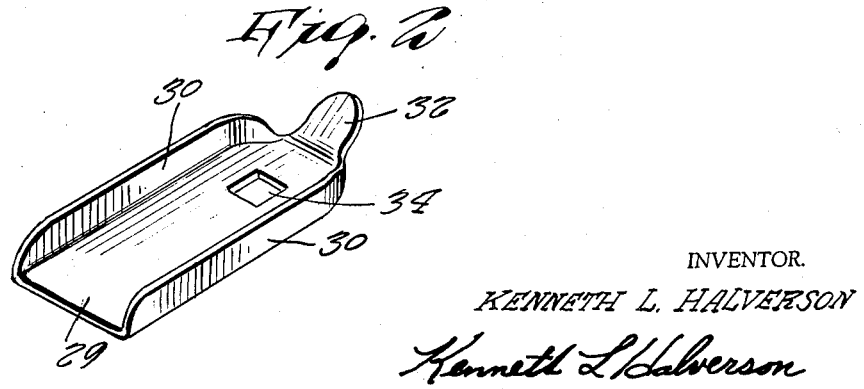

For other objects and for a better understanding of the invention, reference may be had to the following detailed description taken in conjunction with the accompanying drawing, in which:

Figure 1 is a side elevational view, with parts broken away, of a measuring and dispensing device made in accordance with the present invention in operative use; and Figure 2 is a perspective view of one of the valve members forming a part of the present invention.

Referring now more in detail to the drawing, a combination measuring and dispensing device 10 made in accordance with the present invention is shown in operative association with a container 12, such as a jar or can. This device includes a substantially conical main body member 14 having a circular cylindrical internally threaded base 15 at one end and an outwardly extending cylindrical spout 17 at the opposite end. A plunger type valve 20 is carried by the main body portion 14 of the device for controlling the flow of fluent material through the discharge opening 23 in the main body portion 14 and into the cylindrical spout 17. This valve includes a flexible stem 22 having a conical head 21 at one end and a finger pressure plate 24 at the opposite end. A grommet 26 integral with the mid portion of the stem 22 engages within an opening 27 in the side wall of the main body portion 14 for positioning the valve assembly in an operative relationship. A springlike resilient stiffener member 25 is embedded within the stem of the valve and normally urges the valve head 21 into closing engagement with the discharge opening 23. However, in response to a downward pressure upon the finger plate 24, the valve head 21 may be moved out of closing engagement with the opening 23 to permit the flow of the fluent contents into the measuring spout 17 that is provided with indicia 18 to indicate a quantity thereof. The opposite outer end of the spout 17 is provided with a dispensing valve plate 29 that is hingedly connected thereto by means of a grommet 35 that is supported upon a downward extension 36 of the spout and which is received within a rectangular opening 34 in the base of the valve plate. Side flanges 30 direct the flow of the contents downwardly toward the open end of the valve plate 29, while a finger pressure plate 32 extends upwardly from the opposite end thereof to facilitate the opening and closing of this unit.

In actual use, it is only necessary to thread the base 15 of the device onto the open end of a suitable container. By then inverting the container and depressing the finger plate 24 of the plunger valve unit 20, a desired amount of fluent material may be discharged into the measuring spout 17 until the desired quantity is disposed therein as indicated by the meaesuring indicia 18. By then releasing the pressure on the finger plate 24, the valve head 21 will automatically move to the closed position by the action of the stiffener member 25, whereupon the measured mass may be discharged outwardly through the end of the measuring spout 17 by depressing the finger plate 32 of the dispensing valve plate 29, following which the pressure is removed therefrom and the device is ready for the next operation. It will thus be recognized that this device can be used for accurately measuring a variety of ingredients such as coffee, tea, and the like, while it may be readily disassembled for cleaning purposes. The contents of the container are protected from contamination and moisture by the action of the two valves so that the contents of the container retain their fresh aroma and flavor.

While various changes may be made in the detail construction, it shall be understood that such changes shall be within the spirit and scope of the present invention as defined by the appended claim.

What I claim as new and desire to protect by Letters Patent of the United States is:

A measuring and dispensing closure cap comprising, in combination, a hollow conical main body portion having an internally threaded cylindrical base at one end for threaded engagement with a jar and circular discharge opening at the opposite end, a circular cylindrical spout integral with said opposite end of said main body portion in communication with the interior of said main body portion, means for selectively controlling the passage of a fluent mass into said spout from said main body portion, means for measuring the quantity of said fluent mass passing into said spout, and means for selectively dispensing said measured fluent mass from said spout, said means for selectively controlling the passage of said fluent mass comprising a plunger valve, said measuring means comprising an indicia carried by said spout, said dispensing means comprising a dispensing valve plate pivotally carried by the outer end of said spout, said plunger valve comprising a flexible stem, a conical head at one end of said stem, a finger plate at the opposite end of said stem, a grommet integral with the mid portion of said stem for supported engagement upon said main body portion, and a resilient stiffener member within said stem normally urging said valve head into closed engagement with the opening defining portion of said spout.

References Cited in the file of this patent

UNITED STATES PATENTS

| | | |
|---|---|---|
| 1,520,637 | Frank | Dec. 23, 1924 |
| 2,772,817 | Jauch | Dec. 4, 1956 |
| 2,806,639 | Halverson | Sept. 17, 1957 |